(12) United States Patent
Feigel

(10) Patent No.: US 11,745,717 B2
(45) Date of Patent: Sep. 5, 2023

(54) ACTUATION UNIT FOR BRAKING SYSTEM

(71) Applicant: HL MANDO CORPORATION, Gyeonggi-do (KR)

(72) Inventor: Hansjoerg Feigel, Seoul (KR)

(73) Assignee: HL MANDO CORPORATION, Gyeonggi-Do (KR)

(*) Notice: Subject to any disclaimer, the term of this patent is extended or adjusted under 35 U.S.C. 154(b) by 331 days.

(21) Appl. No.: 15/980,738

(22) Filed: May 16, 2018

(65) Prior Publication Data

US 2018/0334155 A1    Nov. 22, 2018

(30) Foreign Application Priority Data

May 16, 2017 (KR) .................. 10-2017-0060352

(51) Int. Cl.
| B60T 17/22 | (2006.01) |
| B60T 7/04 | (2006.01) |
| B60T 8/40 | (2006.01) |
| B60T 8/00 | (2006.01) |
| B60T 8/38 | (2006.01) |

(52) U.S. Cl.
CPC ............ B60T 17/221 (2013.01); B60T 7/042 (2013.01); B60T 8/00 (2013.01); B60T 8/4072 (2013.01); *B60T 8/38* (2013.01); *B60T 2270/10* (2013.01); *B60T 2270/30* (2013.01); *B60T 2270/82* (2013.01)

(58) Field of Classification Search
CPC ........ B60T 17/221; B60T 8/00; B60T 8/4072; B60T 7/042; B60T 8/38; B60T 2270/82; B60T 2270/10; B60T 2270/30; B60T 13/66; B60T 13/12; B60T 7/06
USPC ......................................................... 701/34.4
See application file for complete search history.

(56) References Cited

U.S. PATENT DOCUMENTS

| 7,755,474 B2* | 7/2010 | Singh .................... B60Q 1/444 340/479 |
| 2004/0164612 A1* | 8/2004 | Worrel ..................... B60L 7/26 303/177 |
| 2015/0330853 A1* | 11/2015 | Wessner .................... G01L 5/28 702/182 |
| 2017/0050629 A1* | 2/2017 | Kim ..................... B60T 13/686 |
| 2017/0158184 A1* | 6/2017 | Choi .................... B60T 13/686 |

FOREIGN PATENT DOCUMENTS

DE           19920850 A1 *   8/1992

* cited by examiner

*Primary Examiner* — Maceeh Anwari
(74) *Attorney, Agent, or Firm* — Ladas & Parry, LLP

(57) ABSTRACT

Provided herein is an actuation unit for a braking system. The actuation unit for a braking system includes a piston directly or indirectly connected to a brake pedal, an electronic control unit, a hydraulic pressure unit, an electronic memory unit mechanically connected to the hydraulic pressure unit, and a position sensor configured to detect movement of the piston connected to the brake pedal, wherein a signal of the position sensor is corrected, and data for correcting the signal is stored in the electronic memory unit.

12 Claims, 1 Drawing Sheet

ACTUATION UNIT FOR BRAKING SYSTEM

CROSS-REFERENCE TO RELATED APPLICATION

This application claims priority to and the benefit of Korean Patent Application No. 10-2017-0060352, filed on May 16, 2017, the disclosure of which is incorporated herein by reference in its entirety.

BACKGROUND

1. Field of the Invention

The present invention relates to an actuation unit for a braking system.

2. Discussion of Related Art

Generally, a braking system for braking is installed in a vehicle, and a system configured to electronically control a hydraulic pressure for braking transferred toward a wheel cylinder installed in a wheel to obtain a more powerful and stable braking force has recently been proposed.

There is an anti-lock brake system (ABS), a brake traction control system (BTCS), an electronic stability control (ESC) system, or the like as an example of an electronic brake system.

Such an electronic brake system is a system in which, when a driver depresses a pedal, an electron control unit (ECU) detects the depressing and generates a hydraulic pressure by operating a hydraulic pressure generator to perform a braking action.

That is, when the driver depresses the brake pedal, a pedal displacement sensor detects a displacement of the brake pedal to operate the hydraulic pressure generator, and thus a braking action is performed.

Meanwhile, an electro-hydraulic brake, which is one type of hydraulic brake, is a brake system in which, when a driver depresses a pedal, a controller detects the depressing and supplies a hydraulic pressure to a master cylinder to transmit a hydraulic pressure for braking to a wheel cylinder (not shown) of each of the wheels, and thus a braking force is generated.

Although the electro-hydraulic brake is configured and used such that control is easy, an advanced electro-hydraulic brake in which a safety of a vehicle is secured, fuel efficiency is improved, and a pedal feeling is acceptable during braking, which are needed by a user, has been required.

Accordingly, a study for developing an electro-hydraulic brake, in which a configuration thereof is simple, a braking force may be easily generated even when a failure occurs, and control is also easy, has progressed according to the above requirements.

SUMMARY OF THE INVENTION

The present invention is directed to providing an actuation unit for a braking system capable of reducing an amount of computational load by reducing unnecessary detection of an internal pressure of a cylinder, of improving pressure control performance, and of providing a brake feeling the same as that of a conventional mechanical braking system.

According to an aspect of the present invention, there is provided an actuation unit for a braking system, including a piston directly or indirectly connected to a brake pedal, an electronic control unit, and a hydraulic pressure unit, and the actuation unit includes an electronic memory unit mechanically connected to the hydraulic pressure unit, and a position sensor configured to detect movement of the piston or another part connected to the brake pedal, wherein a signal of the position sensor is corrected, and data for correcting the signal is stored in the electronic memory unit.

The electronic memory unit may be integrated with a pressure sensor.

The correction data may be generated using a reference position sensor, and stored in the electronic control unit and the electronic memory unit.

In a case in which the electronic control unit is replaced, a substitute electronic control unit may read the correction data from the electronic memory unit.

The position sensor may detect a change in a magnetic field, and an encoder may comprise permanent magnet which is configured to move as the piston moves.

The position sensor may detect a three dimensional magnetic field, and remove an influence of an external perturbation magnetic field about a movement axis of the encoder.

The position sensor and the electronic memory unit may be connected to the electronic control unit through a spring.

The position sensor may be fixed by glue.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
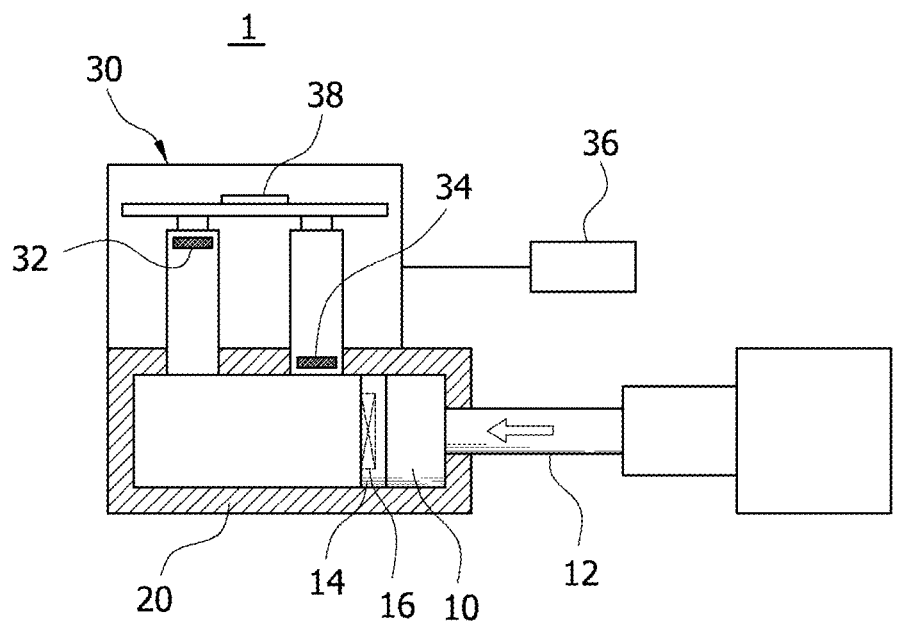
FIG. 1 is a schematic view illustrating an actuation unit for a braking system according to one embodiment of the present invention.

Hereinafter, embodiments that are easily performed by those skilled in the art will be described in detail with reference to the accompanying drawings. However, the embodiments of the present invention may be implemented in several different forms, and are not limited to the embodiments described herein. Parts irrelevant to the description are omitted in the drawings in order to clearly explain the embodiments of the present invention. Similar parts are denoted by the same reference numerals throughout this specification.

In the present specification, it should be understood that the terms such as "including," "having," and "comprising" are intended to indicate the presence of features, numbers, steps, actions, components, parts, or combinations thereof disclosed in the specification, and are not intended to preclude the possibility that one or more other features, numbers, steps, actions, components, parts, or combinations thereof may be present or added.

Figure 2:
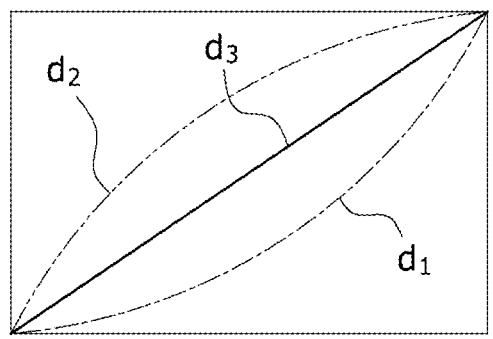
FIG. 2 is a graph illustrating signals of a position sensor of the actuation unit for a braking system according to one embodiment of the present invention before and after the signals are corrected.

FIG. 1 is a schematic view illustrating an actuation unit for a braking system according to one embodiment of the present invention, and FIG. 2 is a graph illustrating signals of a position sensor of the actuation unit for a braking system according to one embodiment of the present invention before and after the of the signals are corrected.

Referring to FIG. 1, an actuation unit 1 for a braking system according to one embodiment of the present invention includes a piston 10, a hydraulic pressure unit 20, an electronic control unit (ECU) 30, an electronic memory unit 32, and a position sensor 34.

In the actuation unit 1 for a braking system according to one embodiment of the present invention, when a driver depresses a pedal, the ECU 30 may detect the depressing and transmit a braking hydraulic pressure to a wheel cylinder (not shown) of each of wheels to generate a braking force.

Referring to FIG. 1, in one embodiment of the present invention, the piston 10 may be formed to slidably move forward and backward by a depressing force of a brake pedal (not shown). Here, a spring (not shown) may be installed in a chamber (not shown) such that, when the depression force is removed, the piston 10 is returned to an original position thereof.

In addition, in one embodiment of the present invention, an input rod 12 may be connected to one end portion of the piston 10. Here, in one embodiment of the present invention, the input rod 12 may be connected to the pedal so that the input rod 12 may move forward and backward according to an operation of the driver.

Referring to FIG. 1, an encoder 14 capable of measuring a displacement of the brake pedal may be installed at the other end portion of the piston 10. Here, in one embodiment of the present invention, the encoder 14 may comprise a permanent magnet 16 which is configured to move as the piston 10 moves.

Meanwhile, in one embodiment of the present invention, the hydraulic pressure unit 20 may generate a hydraulic pressure proportional to a depression force applied by the driver. Here, the hydraulic pressure of the hydraulic pressure unit 20 may be adjusted by the ECU 30.

Referring to FIG. 1, the actuation unit 1 for a braking system according to one embodiment of the present invention may transmit information on a pedal pressure to the ECU 30 when the driver depresses the pedal.

In one embodiment of the present invention, when the driver depresses the pedal, the ECU 30 may detect an amount of braking required by the driver through information such as a pressure generated by the brake pedal which is depressed by the driver and measured by the position sensor 34.

Here, the ECU 30 may operate the hydraulic pressure unit 20 for generating a hydraulic pressure for braking. Meanwhile, in one embodiment of the present invention, a motor (not shown) may be connected to the ECU 30, and here, the motor may be a brushless alternating current (BLAC) motor which is a three phase AC motor.

Referring to FIG. 1, in one embodiment of the present invention, the ECU 30 may control a valve block (not shown) located at one side of the hydraulic pressure unit 20 and configured to block or allow a fluid flow using an electrical signal to perform a function of an anti-lock brake system (ABS), electronic stability control (ESC), or the like.

In addition, in one embodiment of the present invention, the ECU 30 may include the electronic memory unit 32, the position sensor 34, and a substitute ECU 38. Here, the position sensor 34 may detect a three dimensional change in a magnetic field and may be connected to the ECU 30.

Referring to FIG. 2, in one embodiment of the present invention, the position sensor 34 may have a signal d1 which is not corrected. Here, the position sensor 34 may be fixed by glue. In addition, the position sensor 34 may remove an influence of an external perturbation magnetic field about a movement axis of the encoder 14.

Meanwhile, in one embodiment of the present invention, the electronic memory unit 32 may be mechanically connected to the hydraulic pressure unit 20. Here, the electronic memory unit 32 may be integrated with a pressure sensor. Here, in one embodiment of the present invention, the position sensor 34 and the electronic memory unit 32 may be connected to the ECU 30 through a spring (not shown).

Referring to FIG. 1, correction data d2 may be generated using the reference position sensor 34. The generated correction data d2 may be stored in the ECU 30 and the electronic memory unit 32.

Meanwhile, in one embodiment of the present invention, in a case in which the electronic control unit ECU 30 is replaced, the substitute ECU 38 may read the correction data from the electronic memory unit 32.

Here, the actuation unit 1 for a braking system according to one embodiment of the present invention may correct the signal d1 detected by the position sensor 34 using the correction data d2 to transmit a corrected signal d3 to the ECU 30.

Accordingly, in one embodiment of the present invention, the actuation unit 1 for a braking system may provide a depression force to the pedal on the basis of the pedal pressure, and correct the signal detected by the position sensor using correction data to reduce a feeling of difference of the driver during driving.

In addition, since the actuation unit 1 for a braking system according to one embodiment of the present invention corrects the position of the piston by correcting the signal of the position sensor 34, control performance and stability may be improved.

As described above, since an actuation unit for a braking system according to one embodiment of the present invention corrects a signal of a position sensor to correct a position of a piston, control performance and stability can be improved.

Meanwhile, since the actuation unit for a braking system according to one embodiment of the present invention supplies a depression force to a pedal on the basis of a pedal pressure of a driver and corrects a signal generated by the position sensor using correction data, a feeling of difference of a user can be reduced during driving.

While the embodiments of the present invention have been described above, the spirit of the present invention is not limited to the embodiments described in this specification, other embodiments may be easily proposed within the same spirit through adding, modifying, deleting, supplementing of components, and the like by those understanding the spirit of the present invention, and these will also fall within the spirit of the present invention.

What is claimed is:

1. An actuation unit for a braking system, including a piston directly or indirectly connected to a brake pedal, an electronic control unit, and a hydraulic pressure unit, the actuation unit comprising:
   an electronic memory unit mechanically connected and fixed to the hydraulic pressure unit; and
   a position sensor configured to generate a signal in response to detection of movement of the piston connected to the brake pedal,
   wherein the electronic memory unit is configured to store data for correcting signals of the position sensor, and the actuation unit is configured to correct the signal generated by the position sensor based on the data stored in the electronic memory unit to adjust a position of the piston connected to the brake pedal.

2. The actuation unit of claim 1, wherein the electronic memory unit is integrated with the pressure sensor.

3. The actuation unit of claim 1, wherein the correction data is generated using a reference position sensor and stored in the electronic control unit and the electronic memory unit.

4. The actuation unit of claim 1, wherein, in a case in which the electronic control unit is replaced, a substitute electronic control unit reads the correction data from the electronic memory unit.

5. The actuation unit of claim 4, wherein:
the position sensor detects a change in a magnetic field; and
an encoder comprises a permanent magnet which is configured to move as the piston moves.

6. The actuation unit of claim 5, wherein the position sensor detects a three dimensional magnetic field and removes an influence of an external perturbation magnetic field about a movement axis of the encoder.

7. The actuation unit of claim 1, wherein the position sensor and the electronic memory unit are connected to the electronic control unit through a spring.

8. The actuation unit of claim 5, wherein the position sensor is fixed by glue.

9. The actuation unit of claim 1, wherein the hydraulic pressure unit is configured to generate a hydraulic pressure in response to movement of the brake pedal.

10. An actuation unit for a brake system, comprising:
a piston operably connected to a brake pedal;
a hydraulic pressure unit configured to generate a hydraulic pressure in response to movement of the brake pedal;
a position sensor configured to generate a signal in response to detection of movement of the piston connected to the brake pedal; and
memory fixed to the hydraulic pressure unit and configured to store data for correcting signals of the position sensor,
wherein the actuation unit is configured to correct the signal generated by the position sensor based on the data stored in the memory to adjust a position of the piston connected to the brake pedal.

11. The actuation unit of claim 10, wherein the memory is integrated with the pressure sensor.

12. The actuation unit of claim 10, further comprising an electronic control unit electrically connected with the memory and the position sensor, the electronic control unit configured to correct a signal of the position sensor,
wherein the data stored in the memory comprises data for correcting the signal of the position sensor.

* * * * *